Figure 1:
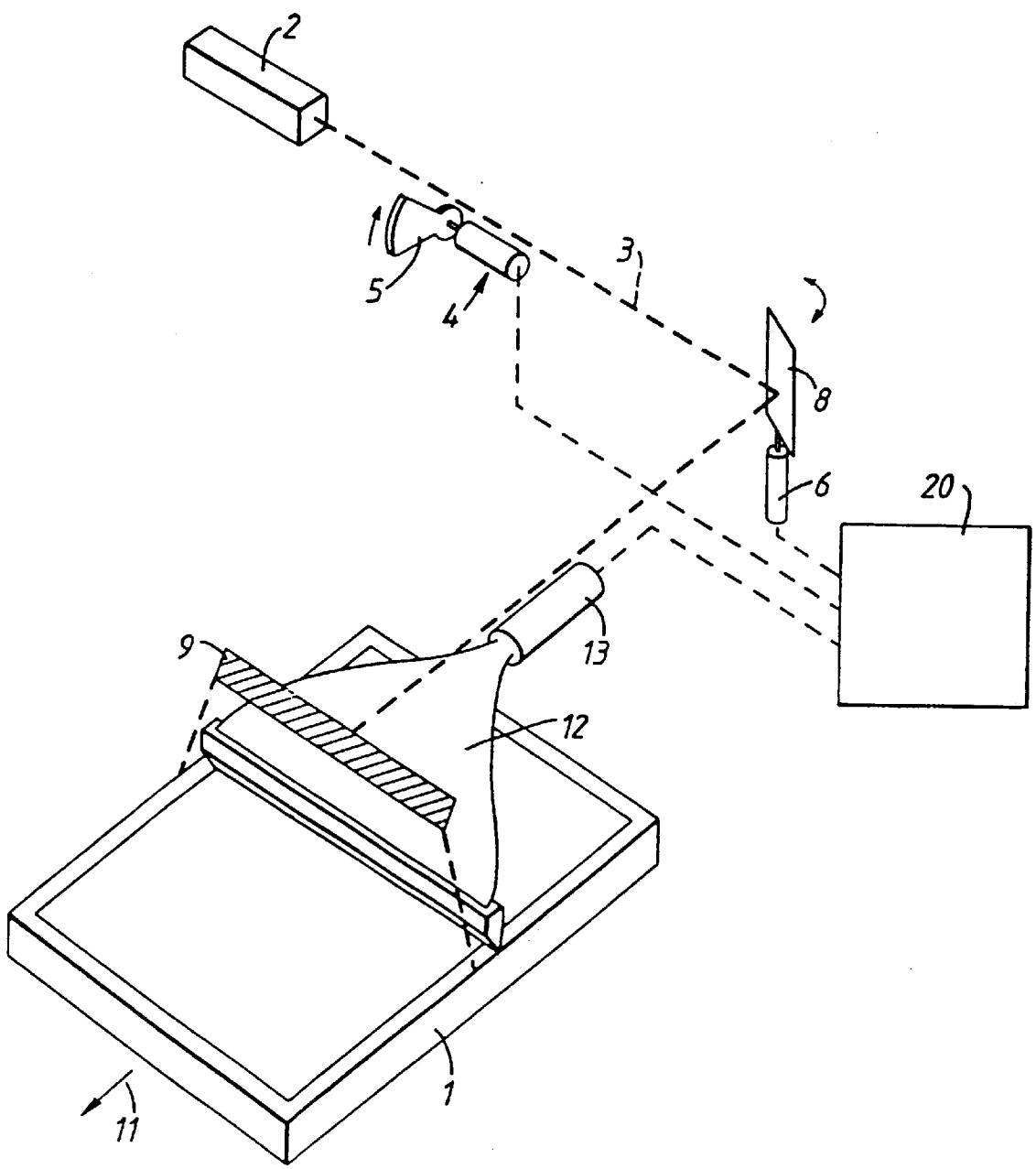

United States Patent [19]
Struye et al.

[11] Patent Number: 5,923,043
[45] Date of Patent: Jul. 13, 1999

[54] ELECTRON BEAM IMAGE RECORDING AND REPRODUCTION METHOD

[75] Inventors: Luc Struye, Mortsel; Paul Leblans, Kontich; Peter Willems, Stekene, all of Belgium

[73] Assignee: Agfa-Gevaert, Mortsel, Belgium

[21] Appl. No.: 08/933,731

[22] Filed: Sep. 23, 1997

Related U.S. Application Data

[60] Provisional application No. 60/031,680, Nov. 22, 1996.

[30] Foreign Application Priority Data

Sep. 25, 1996 [EP] European Pat. Off. .............. 96202684

[51] Int. Cl.⁶ ............................. G03B 42/00; G01N 23/04
[52] U.S. Cl. ................... 250/584; 250/484.2; 250/484.3; 250/484.4; 250/582; 250/585; 250/586; 250/588
[58] Field of Search ..................................... 250/584, 582, 250/585, 587, 586, 588, 484.2, 484.3, 484.4, 337, 310, 311, 362, 363.01

[56] References Cited

U.S. PATENT DOCUMENTS

| 4,651,220 | 3/1987 | Hosio et al. | 250/311 |
| 4,792,691 | 12/1988 | Morlotti et al. | 250/484.4 |
| 4,849,633 | 7/1989 | Yamada et al. | 250/588 |
| 5,432,354 | 7/1995 | Ohara | 250/582 |
| 5,548,126 | 8/1996 | Exelmans et al. | 250/588 |

*Primary Examiner*—Constantine Hannaher
*Assistant Examiner*—Albert Gagliardi
*Attorney, Agent, or Firm*—Baker & Botts, L.L.P.

[57] ABSTRACT

A method for reading an electron beam image that has been stored in a photostimulable phosphor screen wherein the photostimulable phosphor screen is scanned with stimulating radiation and wherein light emitted upon stimulation is converted in to a digital image signal. Enhanced sensitivity is obtained by heating the screen in between exposure to the electron beam image and stimulation of the screen.

5 Claims, 4 Drawing Sheets

ELECTRON BEAM IMAGE RECORDING AND REPRODUCTION METHOD

This application claims priority from Provisional Application number 60/031,680 filed Nov. 22, 1996.

DESCRIPTION

1. Field of the invention

The present invention is in the field of digital imaging. More specifically the invention relates to a method of reading an electron beam image that has been stored in a photostimulable phosphor screen.

2. Description of the prior art

In the field of digital imaging, and more specifically in the field of digital medical imaging, photostimulable phosphor screens have gained a lot of importance as an intermediary storage medium for radiation images such as X-ray images.

Photostimulable phosphor screens however may also serve as intermediary storage medium for another type of images, more specifically for intermediary storage of radiation images that are generated by an image-wise modulated electron beam (hereinafter called electron beam image).

Electron beam images are encountered in a number of applications.

For example, in non-destructive material testing a sample to be examined is irradiated by means of X-rays. The X-rays passing through the sample are arranged to fall onto a lead foil where they generate a secondary emission of electrons. The image-wise modulated electron beam emitted by the lead foil, is then used to expose a photostimulable phosphor screen.

Also in electron microscope devices or electron diffraction devices an image-wise modulated electron beam is generated. This electron beam image can then be used to expose a photostimulable phosphor screen. Autoradiography is still another field of application.

When a photostimulable phosphor screen has been exposed to an electron beam image it can be applied to a read out apparatus where a digital representation of the stored image is obtained.

In the read out apparatus the exposed photostimulable phosphor screen is scanned by means of stimulating radiation, i.e. radiation within a first wavelength range adapted to the stimulation spectrum of the phosphor.

Upon stimulation the photostimulable phosphor emits image-wise modulated light within a second or emission wavelength range.

The image-wise modulated emitted light is then captured and guided onto a photo-electric convertor such as a photomultiplier where it is converted into an electric signal representation.

To avoid that a residual image remaining in the photostimulable phosphor screen after read out would constitute a source of noise in a next image, the screen is erased after read-out.

Erasing of the residual image can for example be obtained by performing an overall illumination of the screen with light within a wavelength range including the wavelength of the stimulating rays In order to obtain a reproduction of the stored image having optimal image quality, it is of utmost importance that the sensitivity of the system is as high as possible. In other words, it is required to detect as much light as possible by means of the photoconvertor.

3. Objects of the invention

The primary object of the present invention is to provide an improved method for reading an electron beam image that has been stored in a photostimulable phosphor screen.

Further objects will become apparent from the description hereafter.

4. Statement of the invention

To achieve the above object, the present invention provides a method of reading an electron beam image that has been stored in a photostimulable phosphor screen by scanning said screen with stimulating radiation, detecting light emitted upon stimulation and converting detected light into a digital signal representation of said electron beam image, characterised in that the screen is heated before being scanned with stimulating radiation.

In U.S. Pat. No. 4,496,973 a method has disclosed wherein a photostimulable phosphor screen that was irradiated by means of X-rays, was desensitized to eliminate 3% to 60% of the radiation energy stored therein. The desensitization was performed to obtain image input information from a preliminary scan that was suitable for setting scanning conditions for the final scan regardless of the interval between the radiation image recording and the preliminary read out. In one embodiment the desensitization was performed by heating the photostimulable phosphor screen.

The described method is however disadvantageous in that the sensitivity of a screen that has been irradiated by X-rays and that is subsequently heated in between exposure and stimulation (read out), is decreased.

The inventors have found that contrary to the teaching of this document and contrary to the results of a test performed on a screen that has been irradiated with X-rays, there is not a loss of sensitivity but an increase, in case of a screen that has been subjected to an electron beam image.

Preferably the screen sample is heated to a temperature in the range of 70 to 150° Celsius.

The heating is preferably maintained during a time period in between 10 and 100 minutes.

The inventors have exposed a first phosphor screen sample (comprising a BaFBr:Eu$^{2+}$ phosphor) to an X-ray image and have measured the total emission emitted by said screen upon stimulation by means of a laser, more particularly a frequency doubled Nd:Yag laser emitting at 532 nm.

An identical sample has been exposed under identical exposure conditions to the same X-ray image and has thereafter been heated for one hour to 100 degrees Celsius. The total emission by this second sample when stimulated under identical conditions was measured.

Comparison of the results learned that the total emission was decreased by a factor equal to about 5 when the screen had been heated.

A third screen sample of the identical kind was exposed to an electron beam image and was then read out under identical read out conditions.

A fourth screen sample of the identical kind was exposed to an electron beam image and was subsequently heated to 100 degrees Celsius during one hour. This fourth sample was likewise read out under identical read out conditions.

Comparison of the results obtained with respect of the third and the fourth sample showed an increase of the signal by a factor equal to 5.45 in case of a phosphor screen that has been exposed to an electron beam image and that has been heated.

The described example relates to a BaFBr:Eu$^{2+}$ phosphor. Examples of other types of photostimulable phosphors employable in a photostimulable phosphor screen, which are also applicable in the context of the present invention include:

SrS:Ce, Sm, SrS:Eu, Sm, ThO$_2$:Er, and La$_2$O$_2$S:Eu, Sm, as described in U.S. Pat. No. 3,859,527;

ZnS:Cu,Pb, BaO.xAl$_2$O$_3$:Eu, in which $\underline{x}$ is a number satisfying the condition of $0.8 \leq x \leq 10$, and M$^{2+}$O.xSiO$_2$:A, in which M$^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and $\underline{x}$ is a number satisfying the condition of $0.5 \leq x \leq 2.5$, as described in U.S. Pat. No. 4,326,078;

M$^{III}$OX:xCe, in which M$^{III}$ is at least one trivalent metal selected from the group consisting of Pr, Nd, Pm, Sm, Eu, Tb, Dy, Ho, Er, Tm, Yb and Bi; X is at least one element selected from the group consisting of Cl and Br; and $\underline{x}$ is a number satisfying the condition of $0<x<0.1$, as described in Japanese Patent Provisional Publication No. 58(1983)-69281;

LnOX:xA, in which Ln is at least one element selected from the group consisting of La, Y, Gd and Lu, X is at least one element selected from the group consisting of Cl and Br, A is at least one element selected from the group consisting of Ce and Tb, and $\underline{x}$ is a number satisfying the condition of $0<x<0.1$, as described in the above-mentioned U.S. Pat. No. 4,236,078;

(Ba$_{1-x}$,M$^{II}$)FX:yA, in which M$^{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and $\underline{x}$ and $\underline{y}$ are numbers satisfying the conditions of $0 \leq x \leq 0.6$ and $0 \leq y \leq 0.2$ respectively, as described in U.S. Pat. No. 4,239,968.

Bariumfluorohalide phosphors as disclosed in, e.g., U.S. Pat. No. 4,239,968, DE OS 2,928,245, U.S. Pat. No. 4,261,854, U.S. Pat. No. 4,539,138, U.S. Pat. No. 4,512,911, EP 0,029,963, U.S. Pat. No. 4,336,154, U.S. Pat. No. 5,077,144, U.S. Pat. No. 4,948,696, Japanese Patent Provisional Publication No. 55(1980)-12143, Japanese Patent Provisional Publication No. 56(1981)-116777, Japanese Patent Provisional Publication No. 57(1982)-23675, U.S. Pat. No. 5,089,170, U.S. Pat. No. 4,532,071, DE OS 3,304,216, EP 0,142,734, EP 0,144,772, U.S. Pat. No. 4,587,036, U.S. Pat. No. 4,608,190, and EP 0,295,522.

Ba$_{1-x}$Sr$_x$F$_{2-a-b}$X$_b$:zA, wherein X is at least one member selected from the group consisting of Cl and I; x is in the range $0.10 \leq x \leq 0.55$; a is in the range $0.70 \leq a \leq 0.96$; b is in the range $0 \leq b < 0.15$; z is in the range $10^{-7} < z \leq 0.15$, and A is Eu$^{2+}$ or Eu$^{2+}$ together with one or more of the co-dopants selected from the group consisting of Eu$^{3+}$, Y, Tb, Ce, Tm, Dy, Pr, Ho, Nd, Yb, Er, La, Gd and Lu, and wherein fluorine is present stoichiometrically in said phosphor in a larger atom % than bromine taken alone or bromine combined with chlorine and/or iodine, as disclosed in EP 345 903.

Ba$_{1-x-y''-z-r}$Sr$_x$Pb$_{y''}$Cs$_{2r}$Eu$_z$F$_{2-a-b}$Br$_a$I$_b$, wherein $0 \leq x \leq 0.30$, $10^{-4} < y'' < 10^{-3}$, $10^{-7} < z < 0.15$, $0 \leq r < 0.05$, $0.75 \leq a+b \leq 1.00$, $0.05 < b < 0.20$.

Ba$_{1-x-y-z-r}$Sr$_x$Ca$_y$,Pb$_{y''}$Cs$_{2r}$Eu$_z$F$_{2-a-b}$Br$_a$I$_b$, wherein $0 \leq x \leq 0.30$, $0.01 < y < 0.15$, $10^{-4} < y'' < 10^{-3}$, $y = y' + y'' 10^{-7} < z < 0.15$, $0 \leq r < 0.05$, $0.75 \leq a+b \leq 1.00$, $0.05 < b < 0.20$.

Alkali metal phosphors comprising earth alkali metals as disclosed in e.g. U.S. Pat. No. 5,028,509 and EP 0,252,991.

Halosilicate phosphors as disclosed in, e.g., EP 304,121, EP 382,295 and EP 522,619.

The above-described stimulable phosphors are given by no means to restrict the stimulable phosphor employable in the present invention. Any other phosphor can be also employed, provided that the phosphor gives stimulated emission when excited with stimulating rays after exposure to a high energy radiation.

Figure 2:
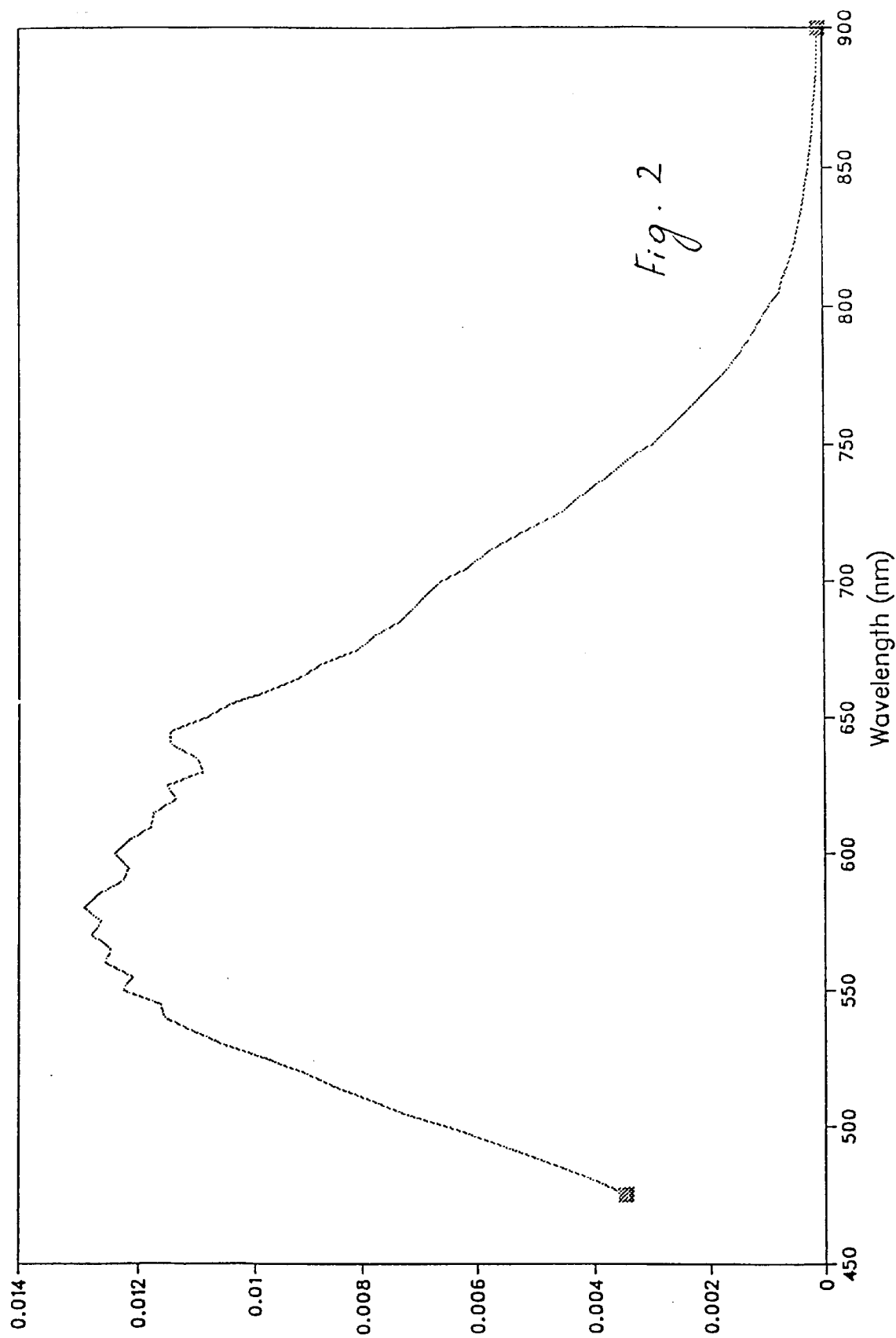
Figure 3:
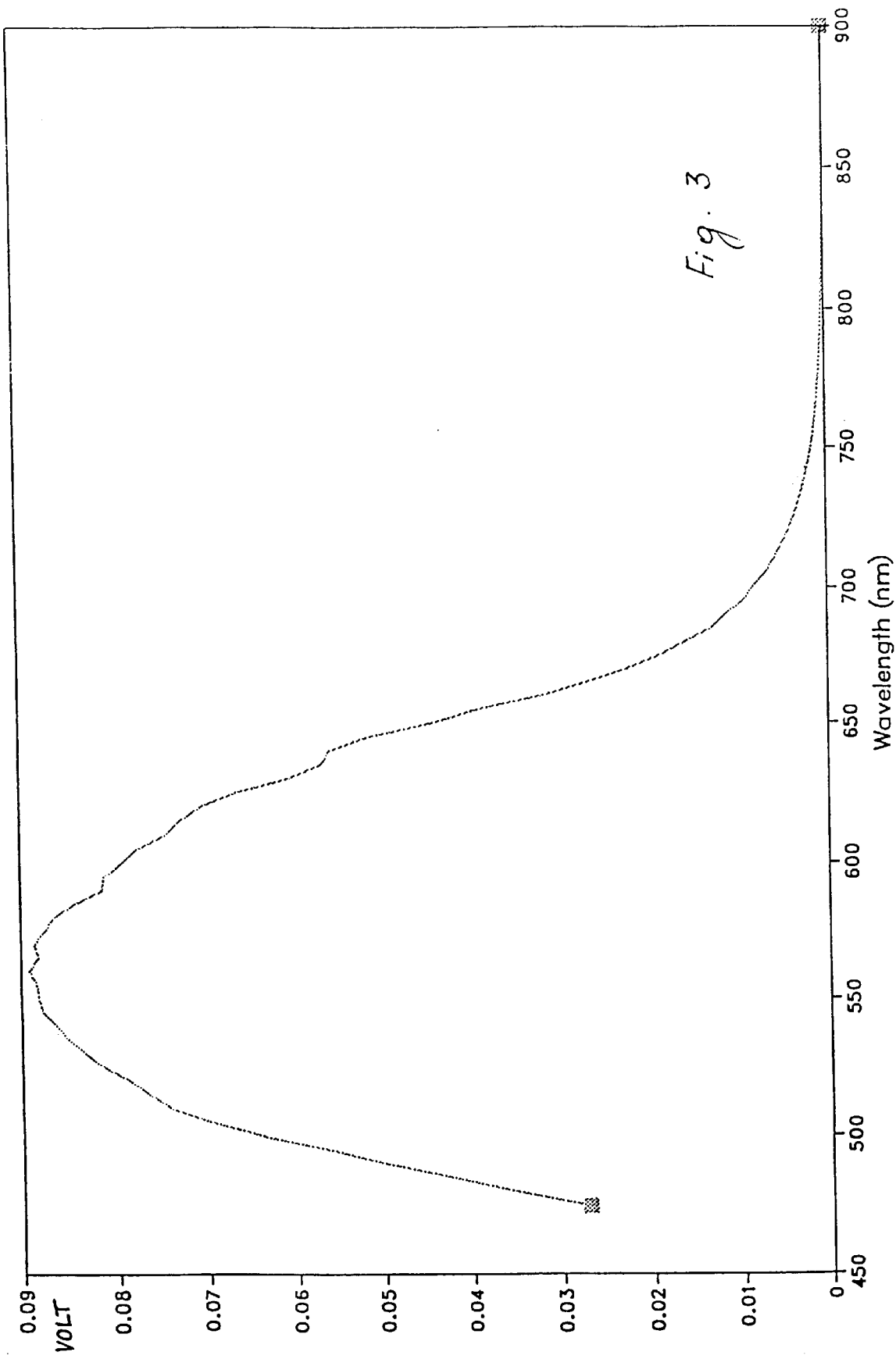

The invention will now be described in more detail, by way of example, with reference to the accompanying drawings, in which:

FIG. 1 generally illustrates an apparatus for reading out a photostimulable phosphor screen, FIG. 2 is the stimulation spectrum of a BaFBr:Eu$^{2+}$ phosphor that has been exposed to an electron beam irradiation, FIG. 3 is the stimulation spectrum of the same BaFBr:Eu$^{2+}$ phosphor that has been exposed to an equal amount of electron beam irradiation and that has been heated.

Figure 4:
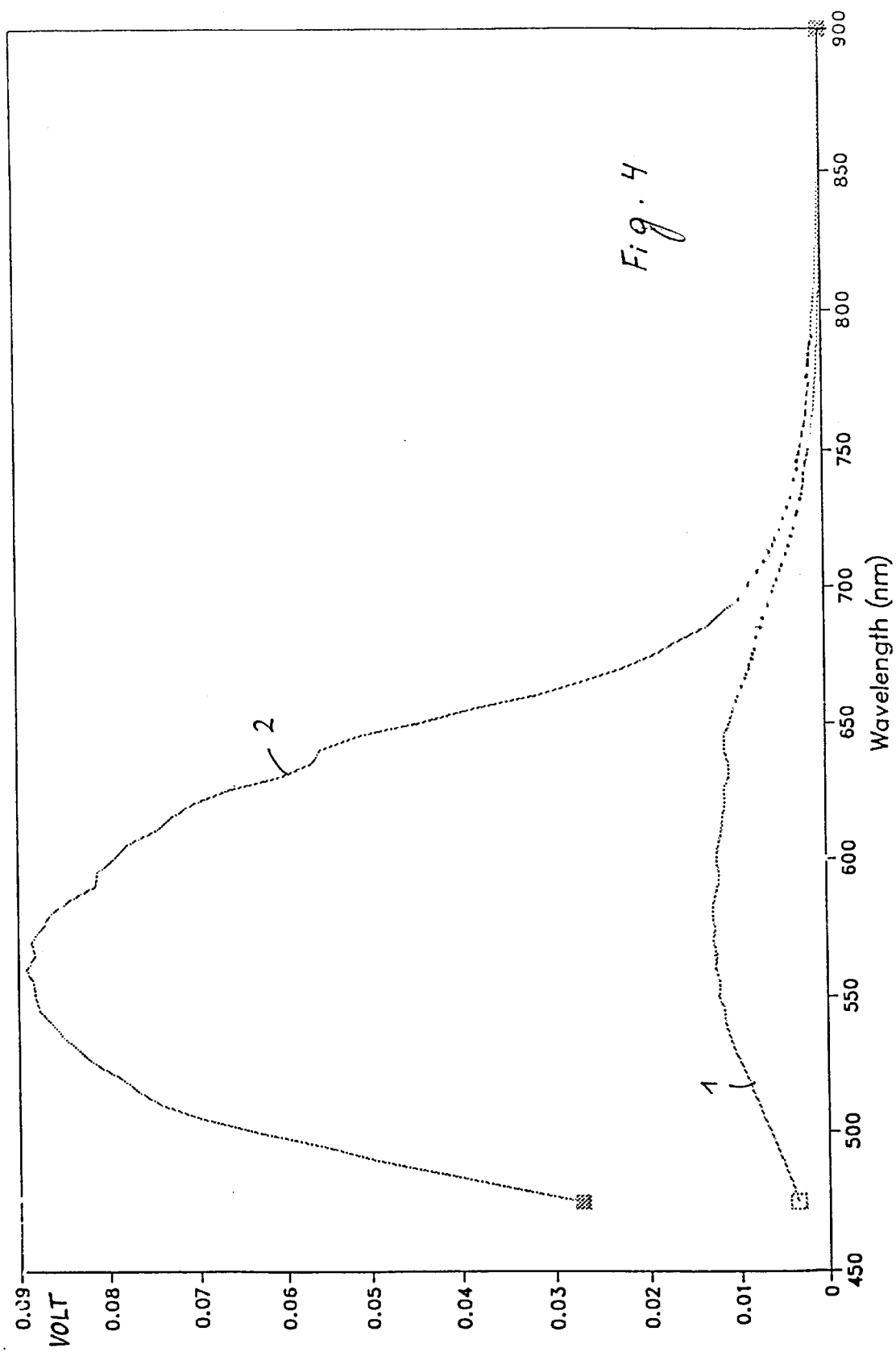

FIG. 4 is a combination of the results shown in FIGS. 2 and 3.

6. Detailed description of the drawings

In FIG. 1 an apparatus is shown for performing the photostimulable phosphor read out steps of the method of the present invention.

After a stimulable phosphor sheet 1 is exposed to electron beam irradiation for example emitted by an electron beam tube, to have a radiation image stored therein, it is heated in a furnace ( type KT 500 of Heraeus) and sent to the read-out station shown in FIG. 1.

A laser beam 3, having a wavelength of 532 nm, is emitted from a Nd:Yag laser source 2 and associated frequency doubling means (not shown), and directed towards a galvanometer mirror 8. Drive means 6 cause the galvanometer mirror to reciprocate in a triangular wave pattern. A light chopper 4, including a rotating disc segment 5, is positioned to enable the disc segment to interrupt the laser beam pathway during the galvanometer retrace step.

Various laser beam focusing devices, known in the art, not shown in the drawings, ensure a uniform beam diameter during scanning of the beam on the phosphor sheet and also ensure that the uniform angular velocity of the reciprocating mirror 8 results in the laser spot travelling across the phosphor sheet at a uniform linear speed. The laser beam 3 is one-dimensionally deflected by the galvanometer mirror 8 and by a plane reflection mirror 9 onto the phosphor sheet 1. Transport means not shown are provided to transport the sheet 1 in the direction of the arrow 11, to enable the whole sheet to be scanned in a uniform manner.

Positioned close to, but behind the scanning line of the laser beam 3 on the phosphor sheet 1, is a light guide 12 which receives light emitted from the phosphor sheet 1 but is shielded from direct exposure to the laser beam 3. The light guide 12 consists of individual optical fibres that are juxtaposed to form a line at the input end of the light guide and that are bundled at the output end. The output end of the light guide is positioned adjacent a photo-detector 13, which produces an electrical signal dependent upon the light intensity falling there on.

Suitable electrical connections are made to pass the output signal from the photo-detector 13 to a computer 20 serve to control the light chopper 4 and the galvanometer mirror drive 6.

FIG. 2 shows the stimulation spectrum of a photostimulable phosphor screen comprising a BaFBr:Eu$^{2+}$ phosphor screen sample that has been uniformly exposed to an electron beam image generated by an electron beam tube (150 kV, 4MRAD).

FIG. 3 shows the stimulation spectrum of an identical photostimulable phosphor screen sample that has been identically exposed to an electron beam image. However, the sample was heated during approximately one hour at a temperature of 100 degrees after having been exposed to the electron beam image and before read out. The image was then read out under identical read out conditions. (I.e. identical adjustment of the photomultiplier).

The stimulation spectra in both cases were obtained by stimulating the exposed phosphor screen with monochromatic light emitted by a tungsten halogen lamp combined with a monochromator.

The wavelength of the light was varied stepwise with a step of 5 nm within the wavelength range of 450 to 900 nm. The emitted light was chopped before impinging on the photostimulable phosphor screen. Light emitted by the screen upon stimulation was detected and converted into an electric pulse signal by means of a photomultiplier.

The amplitude of the pulse-wise signal was measured and the ratio of the measured amplitude over the intensity of the stimulation light was calculated. This ratio is a measure of the stimulation efficiency.

Comparing FIG. 2 with FIG. 3 shows that the stimulation efficiency was increased by a factor equal to about 7 in case of heating of the screen before read out.

In order to optimally illustrate the result of this invention, the results shown in FIG. 2 and in FIG. 3 are combined in FIG. 4.

We claim:

1. Method of reading an electron beam image that has been stored in a photostimulable phosphor screen comprising the steps of
    heating said screen,
    scanning said screen with stimulating radiation,
    detecting light emitted upon stimulation and,
    converting detected light into a digital signal representation of said electron beam image.

2. A method according to claim 1 wherein said photostimulable phosphor screen is heated during a time period in the range of 10 to 100 min.

3. A method according to claim 1 wherein said photostimulable phosphor screen is heated to a temperature in the range of 70 to 150° C.

4. A method according to claim 1 wherein said photostimulable phosphor screen comprises a $BaFBr:Eu^{2+}$ phosphor.

5. A method according to claim 1 wherein said electron beam image is obtained by irradiating a material that generates an electron beam upon exposure to X-rays, with an image-wise modulated X-ray beam.

* * * * *